United States Patent [19]
Marhic

[11] Patent Number: 4,708,424
[45] Date of Patent: Nov. 24, 1987

[54] TRANSMISSIVE SINGLE-MODE FIBER OPTICS STAR NETWORK

[75] Inventor: Michel Marhic, Evanston, Ill.

[73] Assignee: Northwestern University, Evanston, Ill.

[21] Appl. No.: 652,721

[22] Filed: Sep. 21, 1984

[51] Int. Cl.⁴ .............................................. G02B 6/28
[52] U.S. Cl. ................................................. 350/96.16
[58] Field of Search ........................... 350/96.15, 96.16

[56] References Cited

U.S. PATENT DOCUMENTS

| | | | |
|---|---|---|---|
| 3,874,780 | 4/1975 | Love | 350/96.16 |
| 3,937,557 | 2/1976 | Milton | 350/96.16 |
| 4,360,248 | 11/1982 | Bickel et al. | 350/96.16 |
| 4,473,271 | 9/1984 | Mitchell | 350/96.15 |
| 4,498,731 | 2/1985 | Winzer et al. | 350/96.16 |
| 4,511,208 | 4/1985 | Ozeki et al. | 350/96.16 |

OTHER PUBLICATIONS

Tamura, Nakamura, Oshima, Ito and Ozeki; "Optical Cascade Star Network-A New Configuration for a Passive Distribution System with Optical Collision Detection Capability", Journal of Lightwave Technology, vol. LT-2, No. 1, Feb. 1984.
"Local Area Networks Newsletter", vol. 1, No. 11, Mar. 1984.
"Fabricating Singlemode Fiber Couplers", Lasers & Applications, Feb. 1984.
"Optical Networks Using Biconical Taper Couplers-The Transmissive Star", Canstar Communications.
Eric G. Rawson, Robert M. Metcalfe, "Fibernet: Multimode Optical Fibers for Local Computer Networks," IEEE Transactions on Communications, vol. COM-26, No. 7, Jul. 1978.
Marshall C. Hudson and Frank L. Thiel, "The Star Coupler: A Unique Interconnection Component for Multimode Optical Waveguide Communications", Applied Optics, vol. 13, No. 11, Nov. 1974.
A. F. Milton and A. B. Lee, "Optical Access Couplers and a Comparison of Multiterminal Fiber Communication Systems", Applied Optics, vol. 15, No. 1, Jan. 1976.
S. K. Sheem and T. G. Giallorenzi, "Single-Mode Fiber Multi-terminal Star Directional Coupler"; Appl. Phys. Lett., vol. 35, No. 2, Jul. 1979.
J. D. Beasley, D. R. Moore, and D. W. Stowe, "Evanescent Wave Fiber Optic Couplers Three Methods"; Gould Research Center.
R. W. Uhlhorn and S. L. Storozum, "New Fiber Optic Data Bus Topology"; SPIE, vol. 26, Fiber Optics in Adverse Environments, 1981.
U. Killat, G. Rabe and W. Rave, "Binary Phase Gratings for Star Couplers with High Splitting Ratio"; Fiber and Integrated Optics, vol. 4, No. 2, Feb. 1982.
D. H. McMahon, "Efficiency Limitation Imposed by Thermodynamics on Optical Coupling in Fiber-Optic Data Links"; Journal of the Optical Society of America, vol. 65, No. 12, Dec. 1975.
"Bitaper Star Couplers with up to 100 Fibre Channels"; Electronics Letters, vol. 15, No. 14, Jul. 5, 1979.
O. G. Ramer, "Design of Planar Star Couplers for Fiber Optic Systems"; Applied Optics, vol. 19, No. 8, Apr. 1980.
A. Yoshida, R. G. Lamont, and D. C. Johnson, "Cascaded Transmission Star Coupler"; Applied Optics, vol. 20, No. 14, Jul. 1981.
T. Ito, M. Itoh and T. Ozeki, "Bidirectional Tapered Fiber Star Couplers"; Toshiba Research and Development Center.
G. Benjamin Hocker, "Unidirectional Star Coupler for Single-Fiber Distribution Systems"; Optics Letters, vol. 1, No. 4, Oct. 1977.

(List continued on next page.)

Primary Examiner—William L. Sikes
Assistant Examiner—Frank González
Attorney, Agent, or Firm—Welsh & Katz, Ltd.

[57] ABSTRACT

Apparatus and method for interconnection for fabrication of combinatorial transmissive star couplers suitable for single-mode fiber optic local area networks. Various types of couplers including evanescent wave couplers are utilized to synthesize artibrarily large fiber optics star couplers free of multi-path interference providing high quality single-mode capability.

10 Claims, 12 Drawing Figures

OTHER PUBLICATIONS

M. Stockmann and H. H. Witte, "Planar Star Coupler for Multimode Fibers"; Applied Optics, vol. 19, No. 15, Aug. 1980.

"Low-Loss Splicing of a 62.4 km Single-Mode Fibre Link"; Electronics Letters, vol. 18, No. 16, Aug. 1982.

W. J. Tomlinson, I. P. Kaminow, E. A. Chandross, R. L. Fork, and W. T. Silfvast, "Photoinduced Refractive Index Increase in Poly (Methylmethacrylate) and its Applications"; Applied Physics Letters, vol. 16, No. 12, Jun. 1970.

Donald B. Keck, "Single-Mode Fibers Outperform Multimode Cables"; IEEE Spectrum, Mar. 1983.

"Future Trends in Local Area Networks" Information Satikeepers, Inc., Mar. 1984.

David Stamps, "Datapipe to Hike Net Speed 5 Times"; Feb. 22, 1984.

V. Bhatt, J. R. Jones, "A Universal Wiring and Interconnection Approach for Fiber Optic Local Area Networks"; Information Gatekeepers, Inc., Transmission Systems for Telecommunications.

TRANSMISSIVE SINGLE-MODE FIBER OPTICS STAR NETWORK

This invention relates generally to the field of fiber optics and more particularly to transmissive single-mode fiber optics star couplers and networks particularly suitable for local area network applications.

As computers have become smaller, more numerous and more powerful, the need to interconnect them with high speed communications networks has grown dramatically. In response to this need, local area networks (LANS) have been developed to permit resource sharing and to provide increased performance. Prior art local area network systems based upon coaxial cables are widely used but are typically limited to the 10 to 50 megabit per second (Mb/S) range due to basic coaxial cable limitations. Due to the inherent advantages of optical fibers, local area networks have been developed using multimode optical fibers which can operate at 200 Mb/S rate and can interconnect up to 100 stations. However, multimode optical fibers are limited to sub-gigabit per second rates while emerging developments will require local area networks which can operate at data rates in excess of one gigabit per second (Gb/S). To achieve such high speeds, local area network systems will require single-mode fiber optics technology.

Fiber optics local area networks may be segregated into two general types of systems, active and passive. Active systems require complex electro-optical repeaters to regenerate optical signals which are attenuated by the fibers and interconnections, thus creating reliability, efficiency and maintenance problems. Passive systems employ a configuration in which the source terminal broadcasts its data on the network and data is received by the terminals without intervening active devices. Passive systems are generally preferred due to high reliability, simplicity, and cost effectiveness.

In addition to the two system approaches, there are a number of widely used network configurations employed in local area networks including ring, bus and star architectures. For fiber optic local area networks, the star or radial configuration has the advantages of lower loss and better dynamic range characteristics permitting a large number of terminals to be used. In a transmissive star network, output data messages are routed from each terminal to a single centrally located star coupler where a power division function is provided to distribute the data messages to all the terminals. Thus, star networks are desirable for fiber optic local area networks since they evenly divide the input signals among the receivers, thereby making interconnection with many identical stations possible. Star networks have been developed for multimode fiber optic local area networks, in both transmissive and reflective versions. The methods utilized, however, are not suitable to make high quality single-mode stars. Methods based upon the interconnection of Y structures cannot provide low loss single-mode stars, because of the inevitable loss associated with backward propagation through the single-mode Y's. (Although such techniques can be used for multimode systems.) Single-mode stars have been made by using lenses, or diffraction gratings, but these methods have problems with uniformity of outputs and overall efficiency and are therefore not suitable for single-mode stars.

Clearly, the high efficiency and dynamic range characteristics as well as over all system efficiency and reliability, make the passive star a highly desirable component in a fiber optic local area network. Such stars have been fabricated for multimode systems, but no effective single-mode star coupler has been developed which is suitable for a modern many terminal, single-mode communication network.

It is accordingly an object of this invention to provide a novel single-mode combinatorial star coupler suitable for use in a fiber optics local area network.

It is another object of the invention to provide an improved single-mode fiber optics local area network which represents a significant improvement over prior art local area networks.

It it yet another object of the invention to provide a single-mode fiber optic hierarchic star coupler.

It is yet another object of the invention to provide a multi-level combinatorial star coupler of greater than two levels.

It is still another object of the invention to provide a novel method of synthesizing large single-mode stars from smaller stars, uniquely suited to fabrication of high quality single-mode stars from simple components.

Briefly, according to one embodiment of the invention, a method of constructing a fiber optics 2N-star coupler, which can be single-mode or multimode, is provided utilizing 2-star fiber optics couplers having two inputs and two outputs, where $N=2^n$ and n is an integer. The method comprises coupling an output of a first N-star coupler and a corresponding output of a second N-star coupler to the input of a unique 2-star coupler for each output of the first and second N-star couplers to obtain a new 2N-star coupler with $2N=2^{n+1}$. This procedure is repeated utilizing 2N-stars constructed according to the previous step as N-stars until the desired size star is constructed.

According to another embodiment of the invention, a combinatorial single-mode fiber optics $M^n$-star coupler is provided having $M^n$ inputs and $M^n$ outputs, where M and n are integers. The $M^n$-star comprises a plurality of single-mode M-star fiber optics couplers and coupling means for intercoupling the M-star couplers such that there are $M^n$ inputs and $M^n$ outputs and such that each $M^n$ output is the average of all $M^n$ inputs.

According to yet another embodiment of the invention, a single-mode, wide bandwidth fiber optics local area network is provided, comprising a plurality of terminals each having a fiber optics input and a fiber optics output for receiving and transmitting signals. A combinatorial, single-mode fiber optics star coupler is provided for coupling an average of the plurality of terminal outputs to each of the terminal inputs.

BRIEF DESCRIPTION OF DRAWINGS

The features of the present invention which are believed to be novel are set forth below with particularity in the appended claims. The invention, together with further objects and advantages thereof, may be understood by reference to the following description taken in conjunction with the accompanying drawings.

DETAILED DESCRIPTION OF THE PREFERRED EMBODIMENT

Figure 1:
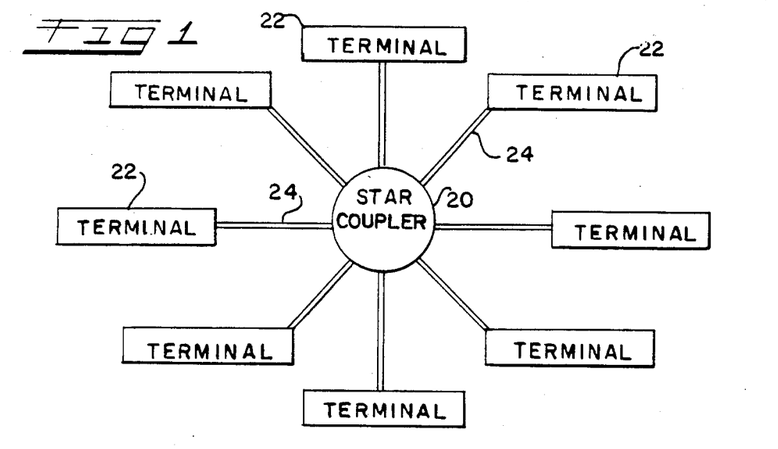
FIG. 1 is a general block diagram of a fiber optic local area star network.

FIG. 1 is a block diagram illustrating a passive star configuration of the fiber optic local area network using a transmissive star coupler 20. A number of terminals, 22, are coupled via optic fiber cables 24 to a fiber optic star coupler 20, as shown, permitting data distribution among all the terminals 22. The number of terminals can be made large in the system, because optical losses do not accumulate. Further, signal levels at the terminals 22 are relatively uniform, so that the dynamic range of the terminal receivers does not need to be wide. In addition, since power division in a star network is relatively uniform, all receivers can operate near the minimum power required for tolerable bit error rates. This permits the highest achievable energy efficiency for a passive system.

Figure 2:
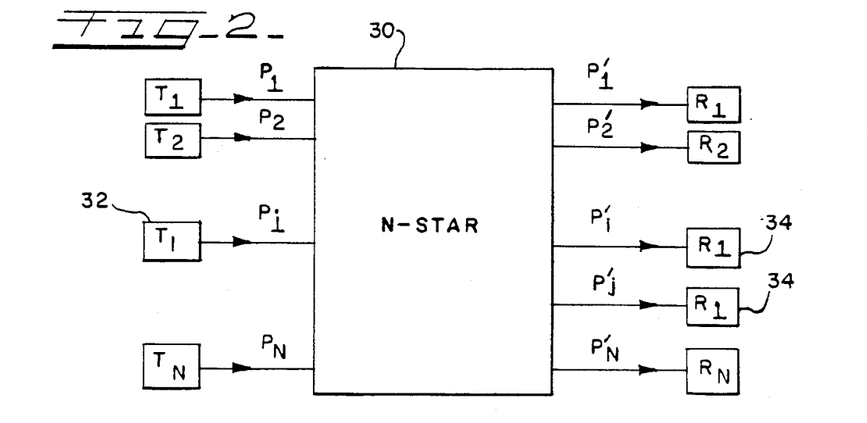
FIG. 2 is a block diagram illustrating an N-Star.

An N by N coupler, or N-port coupler, is a device with N (N greater than 1) inputs and N outputs. If this device evenly distributes the input power among all outputs it is called a transmissive star (i.e., N-star). As shown in FIG. 2, N stations can be interconnected through such an N-star 30, with N transmitters $T_i$ 32 connected to the inputs and the corresponding N receivers $R_i$ 34 connected to the outputs.

If $P_i$ is the power of $T_i$, and $P'_j$ power received by $R_j$ (assuming that $T_i$ and $R_i$ belong to the same station), an ideal transmissive star is one in which the power $P_i$ from one transmitter is evenly divided into (N−1) output powers to the receivers of the other stations. Hence, all receivers can operate at the minimum power required for specified bit error rates, and no higher. Furthermore, no power is wasted on transmitting from $T_i$ to $R_i$. The rather specific restrictions of this configuration, however, make this type of star difficult to realize in practice.

In a very close alternative, shown in FIG. 2, a nearly ideal star, which is almost as efficient for large N and generally simpler to realize, divides $P_i$ from each transmitter 32 into N output powers including $P'_i$ such that $P'_j$ is equal to $P_i$ divided by N for all j. (i.e., the power is evenly divided, but $R_i$ receives a signal from $T_i$, which, in general, is not necessary). Nevertheless, for large N, there is very little disadvantage to using the nearly ideal star. When signals are transmitted simultaneously to all inputs, each output carries the average of all inputs (provided that there are no interference effects due to spatial and/or temporal coherence.) This nearly ideal star is the type of star disclosed herein.

Figure 3:
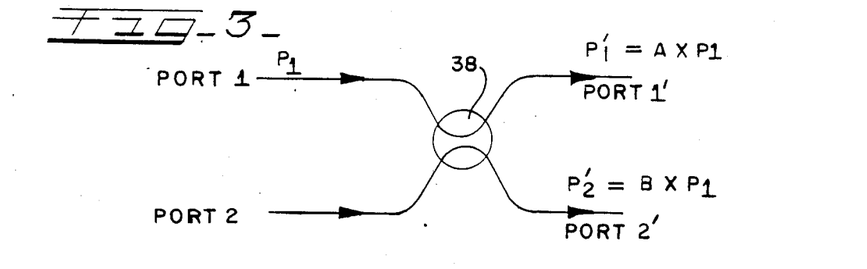
FIG. 3 is a diagram illustrating an elementary evanescent wave coupler.

Among the most efficient and simple single-mode components available are the evanescent wave couplers. FIG. 3 shows a diagram of such an evanescent wave coupler 38. For an ideal coupler, if $P_1$ is the power fed into Port 1, no power emerges from Port 2, while $AxP_1$ and $BxP_1$ emerge from Ports 1' and 2', respectively, as shown. Such couplers have been made with various coupling ratios (B) including a ratio of one-half (i.e., a 3 dB coupler splitting input power evenly into the two outputs.). It is impossible to avoid some extra loss, but prior art devices have been made which keep the insertion loss to about 0.05 dB (which is virtually negligible compared to the useful splitting ratio, especially in a 3 dB coupler.)

High quality 3 dB couplers can be combined according to the invention to form low loss, nearly ideal transmissive single-mode stars, since the 3 dB coupler is actually an elementary nearly ideal transmissive star. These elementary stars can be combined to form transmissive N-stars (i.e., with N input and N output terminals), where N is equal to $2^n$ and n is an integer. These stars can be manufactured based on 3 dB fiber couplers connected by fusion splices. In the prior art values for the insertion loss of such splices are as low as 0.10 dB per splice. Even when this is added to the 0.05 dB insertion loss of the couplers, the excess loss per channel (input to output) is very small compared to the useful power division loss. Hence, these stars constitute practical, nearly ideal devices, which represent a significant breakthrough in the potential for single-mode fiber optic local area networks.

Figure 4A:
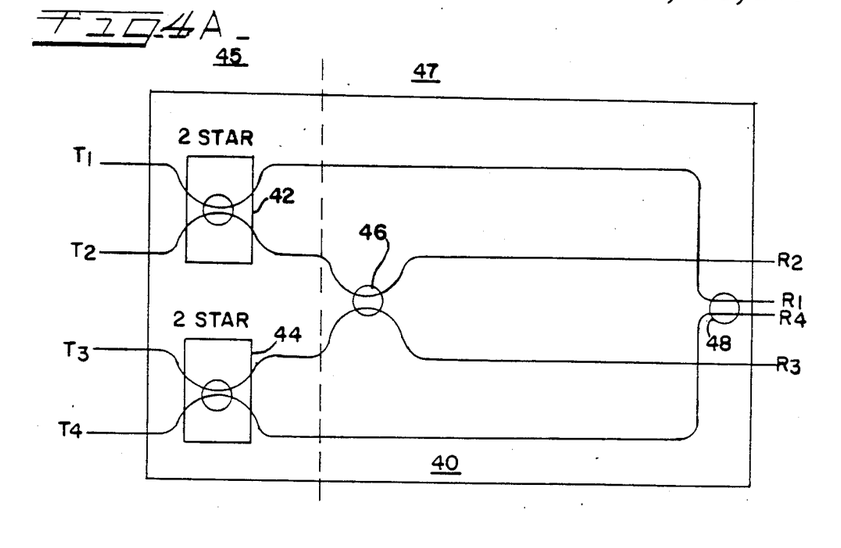
FIG. 4A is a diagram illustrating a specific embodiment of a 4-star coupler according to the invention.

As one example, referring to FIG. 4A, there is shown a 2N-star 40 where N is equal to 2 (i.e., a 4 star) constructed using four 2-stars 42, 44, 46, 48 (i.e., evanescent wave couplers) combined to form a 4-star. In FIG. 4A, a first pair of 2-star couplers 42, 44 form a first layer 45 and the outputs for the first layer are coupled to the inputs of a second pair of 2-star couplers 46, 48 which form a second layer 47. This method of interconnection can be generalized as shown in FIG. 4B.

Figure 4B:
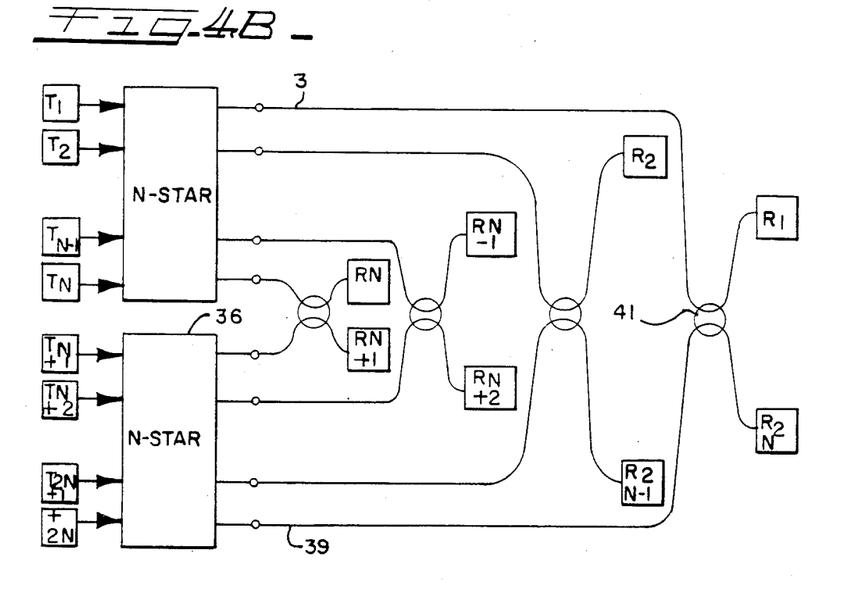
FIG. 4B is a generalized block diagram illustrating a specific embodiment of a 2N-star coupler according to the invention

As illustrated in FIG. 4B, one arbitrary output (e.g. 37) from a first N-star 35, and another output (e.g. 39) from another N-star 36 is coupled respectively into the two inputs of a 2-star 41. The operation is repeated N times with N 2-stars as illustrated. There are then 2N inputs to the total arrangement (all inputs to the two N-stars) as well as 2N outputs (all outputs of the interconnecting 2-stars). By following the power division and combination as shown in FIG. 4B, it can be readily ascertained that it constitutes a 2N-star.

Since elementary 2-stars are known in the art (i.e., evanescent wave couplers), it is clear that $2^n$-stars can be made by interconnecting n layers of 2-stars with each layer containing $2^{n-1}$ number of 2-stars. Clearly, the physical layout of the outputs can be altered by combining different pairs; these different arrangements however, perform the same overall function. Thus, different coupler configurations may be chosen without departing from the basic nature of the invention. Some layouts will be compatible with planar technology developed for integrated optics, but others will not be suitable for planar integration. Integrated optics realization could be implemented by using buried channel technology.

Figure 5:
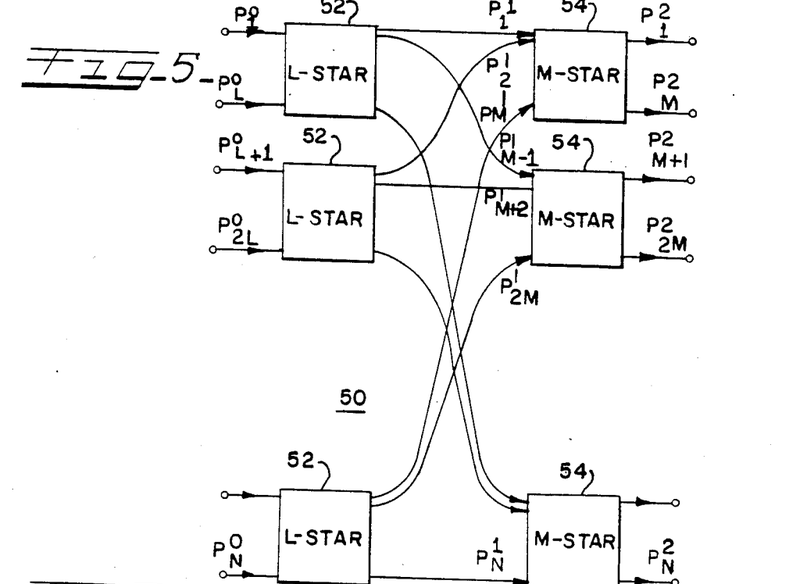
FIG. 5 is a generalized block diagram illustrating a specific embodiment of an (L×M)-star according to the invention.

A further generalization of this concept is shown in FIG. 5, in which L number of M stars 54 and M number of L stars 52 are interconnected to form an (L×M) star 50, as shown. The stars are interconnected, as illustrated in FIG. 5, by taking one output from each L star and connecting these M outputs into the inputs of one M-star. This operation is repeated until all outputs of the L-stars are connected to the inputs of the M-stars. There are then $N=(L \times M)$ inputs, outputs, and interconnections. It can be seen that each input to output connection through the entire arrangement is unique, so that the received signals will be free from interference problems that might result from multi-path propagation as required for single-mode operation. Consequently, the star 50 divides any input power into $N=L \times M$ equal outputs (i.e., it constitutes an N-star where $N=L \times M$).

Single path propagation is a requirement in single-mode systems since multi-path interference effects can cause unpredictable and unreliable results. In addition, averaging effects of speckle patterns in multimode systems render the multimode systems less susceptible to multi-path interference effects. Thus, the novel method of the invention disclosed herein in uniquely suited to making arbitrarily large single-mode stars free of multi-path interference as required for single-mode systems.

The invention thus enables one to construct $(L^k \times M^m)$ stars, where k and m are arbitrary integers, by repeating the disclosed procedure. If many types of stars are available, a correspondingly greater variety of stars can be obtained.

This method can be termed hierarchic since it groups elementary stars into stars of progressively higher orders from the inputs to the outputs. Furthermore, although a completed star can be viewed as a combination of elementary stars in several other ways, its design and operation is most simply implemented in terms of the disclosed hierarchic interconnection principle.

If the elementary stars are reciprocal, so is the entire arrangement, and one can then perform the hierarchic synthesis by starting from either the inputs or the outputs. It is not necessarily true however that the whole structure can be viewed as hierarchic in both directions, although it is possible for some structures. A structure which is hierarchic when viewed backwards from the outputs can be termed reverse-hierarchic. A practical advantage of hierarchic or reverse-hierarchic structures is that they can be used only partially, thereby functioning as smaller stars; this is generally not true of stars that are neither hierarchic nor reverse-hierarchic.

Figure 6:
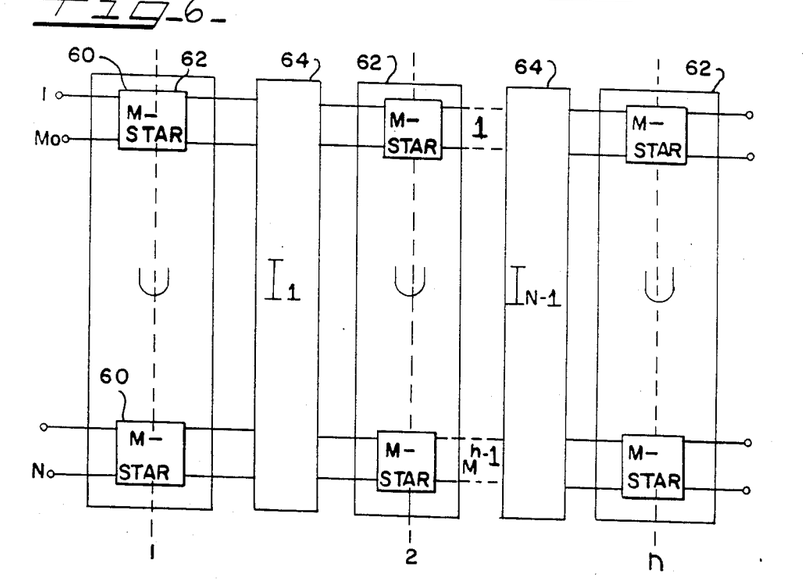
FIG. 6 is a generalized block diagram illustrating a specific embodiment of an $M^n$-star according to the invention.

Beginning with only M stars, one can form $M^n$-stars from them, as shown in FIG. 6. Each layer 62 (1 thru n) shown in FIG. 6 includes $M^{n-1}$ number of M stars 60 with each such layer functioning as an $(M^n \times M^n)$ port. These are connected by $n-1$ intermediate layers 64 of connections, each affecting a different arrangement of outputs to inputs. Since there are n layers of M-stars, the total number of required M-stars is $n \times M^{n-1}$.

Hierarchic and reverse-hierarchic structures as defined herein are structures in which elementary stars are aggregated into progressively larger stars, as new layers are added from the input or from the output respectively. These simple structures provide a novel solution to the problem of construction of the single-mode star. However, there are other star interconnecting schemes which may also perform similar functions.

Figure 7A:
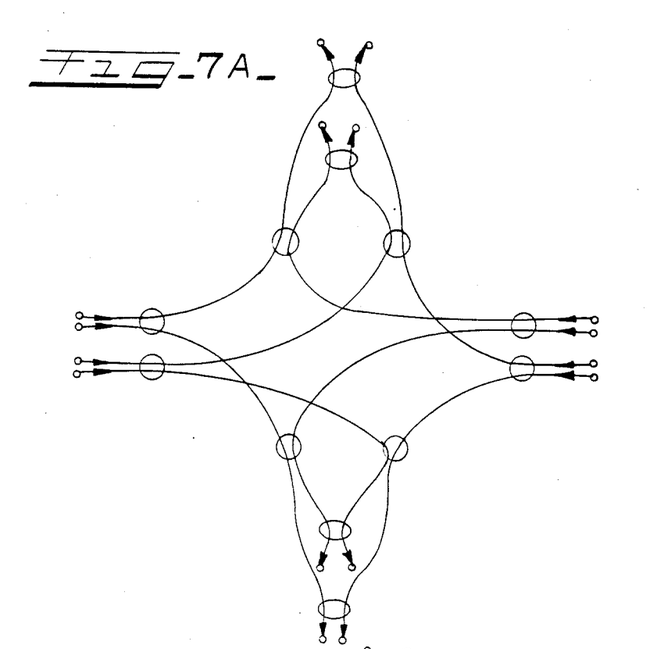
FIG. 7A is a diagram illustrating a specific embodiment of an hierarchic only 8-star.
Figure 7B:
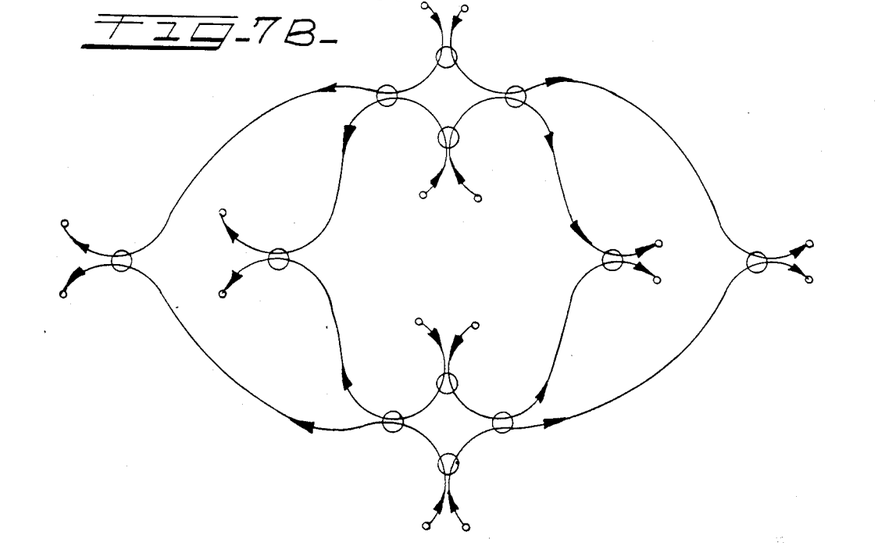
FIG. 7B is a diagram illustrating a specific embodiment of a planar, hierarchic and reverse-hierarchic 8-star.

Utilizing simple elementary 2-stars, which typically are reversible, reversible $2^n$-stars can be made using the hierarchic method. With this approach, 4 stars can be made with only one form, which is symmetric (i.e., is both hierarchic and reverse-hierarchic). This is not true of 8 stars, as they can be configured in two distinct forms: stars which are hierarchic but not reverse-hierarchic (as shown in FIG. 7A) or vice versa, and also symmetric stars (as shown in FIG. 7B). The variety becomes even greater with 16-stars. For example, if a 16-star constructed from one hierarchic but not reverse-hierarchic 8-star and one reverse-hierarchic but not hierarchic 8-star, interconnected by eight 2-stars using the methods disclosed herein above, the overall result is neither hierarchic nor reverse-hierarchic. Thus there exits alternate connection schemes beside hierarchic or reverse-hierarchic for N greater than 8. Such alternate schemes cannot reduce the required number of elementary stars, but they could be used to accomplish other objectives, such as achieving planar (note FIG. 7B is a planar structure) or less tangled structures.

The general principle for the synthesis of these stars is simply that each input to any elementary star (e.g. a 2-star) should be non-overlapping independent inputs, (i.e., any two inputs to such a star must be the averages of two non-overlapping sets of input signals to the whole network). In other words, no common inputs may be coupled to any one elementary star. This rule clearly avoids multi-path propagation through the whole network (since there is only one path from any given input to any given output) which is essential for single-mode systems. To realize a complete star, one must have just enough elementary stars to insure that all network outputs are the average of all network inputs and this number is again given by $n \times M^{n-1}$ for an $M^n$-star. Hierarchic or reverse-hierarchic synthesis is only the simplest way to apply this general principle. Stars constructed using the more general principle of complete even averaging at all outputs can be termed combinatorial stars. There are a variety of known interconnection network schemes that can be used to implement such stars including the cube connection scheme and the perfect shuffle scheme.

Figure 8A:
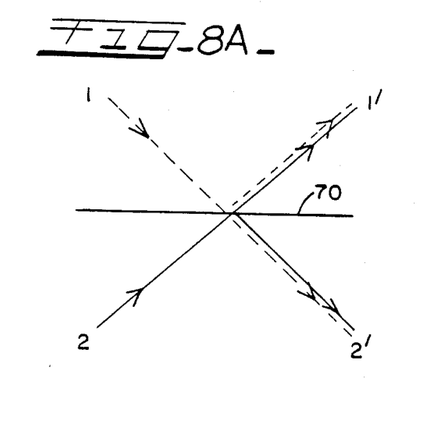
FIG. 8A is an illustration of a beam splitter used as a 2-star.
Figure 8B:
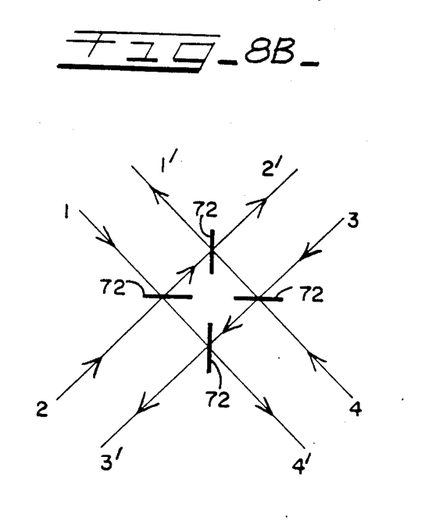
FIG. 8B is an illustration of a 4-star combining 4 beam splitters according to the invention.

The general combinatorial interconnection principle disclosed herein can be implemented in practice by means of whatever technology can provide at least one type of star. For example, a 50% beam splitter 70 can be used as a 2-star as illustrated in FIG. 8A. In turn, such elements can be used to make higher order stars generally with the help of mirrors. For example, a 4-star can be made of just 4 beam splitters 72, as shown in FIG. 8B.

Commercially available evanescent wave couplers with 3 dB coupling ratios as described previously can be used as 2 stars to fabricate a $2^n$-star by interconnecting them with, for example, fusion splices. An alternative, however, is to start with $2^n$ lengths of single-mode fiber, the two ends of each fiber forming one input and one output for the total $2^n$- star, which would be realized by making 3 dB fused couplers from pairs of fibers wherever required. This method would do away with the splices and their associated losses. The actual spatial configuration of the fibers and couplers is not unique, and many equivalent arrangements can be used. This fiber-based method offers a viable approach to rapid fabrication of large single-mode stars yielding stable devices suitable for use in fiber optic local area networks. Although this fused fiber technology can provide very predictable and reliable $2^n$-stars, the fabrication process and resulting structure could be simplified by using other techniques such as the polished fiber approach to making couplers.

Figure 9:
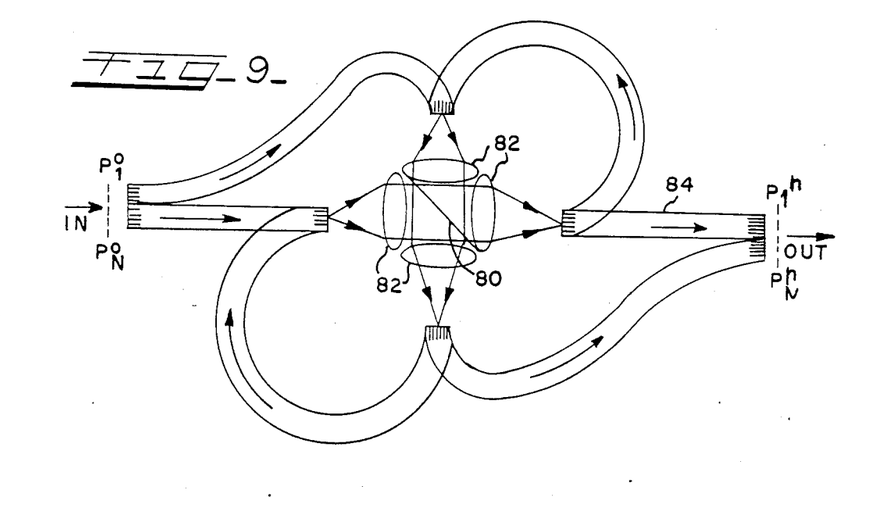
FIG. 9 is an illustration of $2^n$ star using a beam splitter and fiber bundles according to the invention.

Another possible approach to implementation of $2^n$-stars, is essentially a combination of the two proceeding techniques, by using a large beam splitter 80, lens 82, and fiber bundles 84 configured as an optical processor, configured as shown in FIG. 9. The system can be viewed as performing n consecutive matrix multiplications upon the vector of the N input powers. The arrangement of each line of fibers must be such as to correspond to the appropriate matrix.

Clearly, for single-mode fiber systems, the disclosed methods of constructing star networks can readily be implemented using 3 dB evanescent wave couplers, either as discrete components connected by splices or as directly fabricated between interwoven lengths of fiber as well as by using other techniques. Where Gb/S rates of operation of local area networks is required, these hierarchic and combinatorial methods make possible the design and construction of high quality single-mode stars. In addition, these combinatorial and hierarchic methods permit fabrication of stars that can be physically spread out over a large area, thereby avoiding the potential problem of single-point failure.

Specific hierarchic and combinatorial methods and structures have been described herein for purposes of illustrating the manner in which the invention may be made and used. It should be understood that implementation of other variations and modifications of the invention in its various aspects will be apparent to those skilled in the art, and that the invention is not limited thereto by the specific embodiments described. It is therefore contemplated to cover by the present invention any and all modifications, variations, or equivalents that fall within the true spirit and scope of the basic underlying principles disclosed and claimed herein.

What is claimed is.

1. A method of constructing a single-mode fiber optics 2N-star coupler free from multi-path interference utilizing 2-star fiber optics couplers having two inputs and two outputs where $N=2^n$ and n is an integer, said method beginning with $n=1$ comprising the steps of:
    (a) coupling an output of a first N-star coupler and a corresponding output of a second N-star coupler to the input of a unique 2-star coupler for each output of said first and second N-star coupler to obtain an N-star coupler where $2N=2^{n+1}$;
    (b) repeating step (a) at least once utilizing 2N-stars constructed according to the previous repetition as the N-stars until the desired star size is reached.

2. The method of claim 1 wherein each 2-star coupler is a 50% beam splitter.

3. The method of claim 1 wherein each 2-star coupler is a fused fiber coupler and the step of coupling comprises forming fused couplers from a plurality of continuous optic fibers such that the fused couplers are coupled by continuous optic fibers.

4. The method of claim 1 wherein each 2-star coupler is a polished fiber coupler and the step of coupling comprises forming polished fiber couplers from a plurality of continuous optic fibers such that the polished fiber couplers are coupled by continuous optic fibers.

5. A combinatorial single-mode fiber optics $M^n$-star coupler free from multi-path interference, where M and n are integers and where M is greater than two, comprising:
    a plurality of single-mode M-star fiber optics couplers;
    coupling means for intercoupling the single-mode M-star fiber optics couplers such that there are $M^n$ inputs and $M^n$ outputs with only one path from any said input to any said output and such that the single-mode fiber optics M-stars are aggregated in layers from input to output to form progressively larger stars until a single-mode fiber optics $M^n$ star coupler is formed, thereby providing a hierarchic structure.

6. The combinatorial single-mode fiber optics $M^n$-star of claim 5 wherein the M-stars and coupling means are integrated on a monolithic integrated optics substrate.

7. A single-mode, wide bandwidth fiber optics local area network free from multi-path interference comprising:
    a plurality of terminals, each having a fiber optics input and a fiber optics output, for receiving and transmitting signals;
    a combinatorial, single-mode hierarchic fiber optics N-star coupler comprising intercoupled single-mode 2-star couplers for coupling an average of the plurality of terminal outputs of each of the terminal inputs.

8. The combinatorial single-mode fiber optics $M^n$-star coupler of claim 5 wherein the M-star couplers comprise beam splitter means for splitting incident light into two beams, lens means for focusing incident light and a plurality of optical fibers for coupling M inputs to the lens means and beam splitter means and for coupling M outputs from the lens means and beam splitter means, and wherein the optical fibers, lens means and beam splitter means are configured such that such output is the average of all inputs.

9. The combinatorial single-mode fiber optics $M^n$-star coupler of claim 5 wherein the single-mode fiber optic $M^n$-star coupler is planar.

10. The combinatorial single-mode fiber optic M-star coupler of claim 5 wherein the single-mode fiber optics M-stars are aggregated to form a structure which is both hierarchic and reverse hierarchic and which is planar.

* * * * *